Jan. 6, 1931.  A. G. ROSE  1,788,329
APPARATUS FOR FEEDING AND CUTTING PLASTIC MATERIAL
SUCH AS CONFECTIONERY STOCK
Filed April 7, 1930   4 Sheets-Sheet 1

Jan. 6, 1931.  A. G. ROSE  1,788,329
APPARATUS FOR FEEDING AND CUTTING PLASTIC MATERIAL
SUCH AS CONFECTIONERY STOCK
Filed April 7, 1930  4 Sheets-Sheet 3

INVENTOR
Alfred German Rose
By
Watson, Cort, Morse & Grindle
ATTys

Jan. 6, 1931.   A. G. ROSE   1,788,329
APPARATUS FOR FEEDING AND CUTTING PLASTIC MATERIAL
SUCH AS CONFECTIONERY STOCK
Filed April 7, 1930   4 Sheets-Sheet 4

Patented Jan. 6, 1931

1,788,329

UNITED STATES PATENT OFFICE

ALFRED GERMAN ROSE, OF GAINSBOROUGH, ENGLAND, ASSIGNOR TO ROSE BROTHERS (GAINSBOROUGH) LIMITED, OF GAINSBOROUGH, ENGLAND, A BRITISH COMPANY

APPARATUS FOR FEEDING AND CUTTING PLASTIC MATERIAL SUCH AS CONFECTIONERY STOCK

Application filed April 7, 1930, Serial No. 442,425, and in Great Britain April 10, 1929.

This invention comprises improvements in or relating to apparatus for feeding and cutting plastic material such for example as confectionery stock.

The invention is particularly concerned with—although not limited to—apparatus operating in conjunction with a wrapping machine of the type in which a plastic bar of confectionery stock is fed to the machine and successive portions in the length of the bar are severed to form individual caramels or the like each of which is subsequently enclosed in a wrapper. For the purpose of feeding and cutting the bar various mechanisms have been employed. Usually the bar is fed, by one or more sets of rollers, along a horizontal path up to a cutting station at which a knife operates either in a vertical or in a horizontal plane. In the latter case another set of rollers is arranged at the end of the horizontal path aforesaid to turn the leading end of the bar downwardly through a right angle.

The present invention is directed towards providing an improved stock-feeding and cutting apparatus in which a bar of stock is turned, during its feeding motion, by a simple and reliable mechanism which is inexpensive in construction and upkeep and is not liable to become clogged. This invention consists essentially in improved apparatus for feeding and cutting a bar of plastic material (e. g. confectionery stock) comprising the combination of a knife, means to actuate said knife to sever successive portions from the length of the bar, a guideway leading to the knife, a second guideway leading obliquely to said guideway, three rollers arranged at the junction of the guideways, two of which rollers are arranged to co-operate to bend the bar partly round the periphery of the third roller and to direct it from the oblique into the first mentioned guideway, and means to rotate said rollers. This arrangement of three rollers at the junction of the guideways provides a simple and reliable apparatus for turning the plastic bar through the included angle between the two guideways. In feeding mechanisms as hitherto proposed this has been effected either by curved guide-plates over which the bar slides (and to which it is therefore, particularly in the case of toffee, liable to stick and the mechanism become clogged) or by a more complicated arrangement of rollers which is unsatisfactory when the device is operated under the supervision of unskilled labor.

One construction according to this invention will now be described in detail by way of example with reference to the accompanying drawings, in which:—

Throughout this description like reference numerals indicate like parts.

Figure 1:
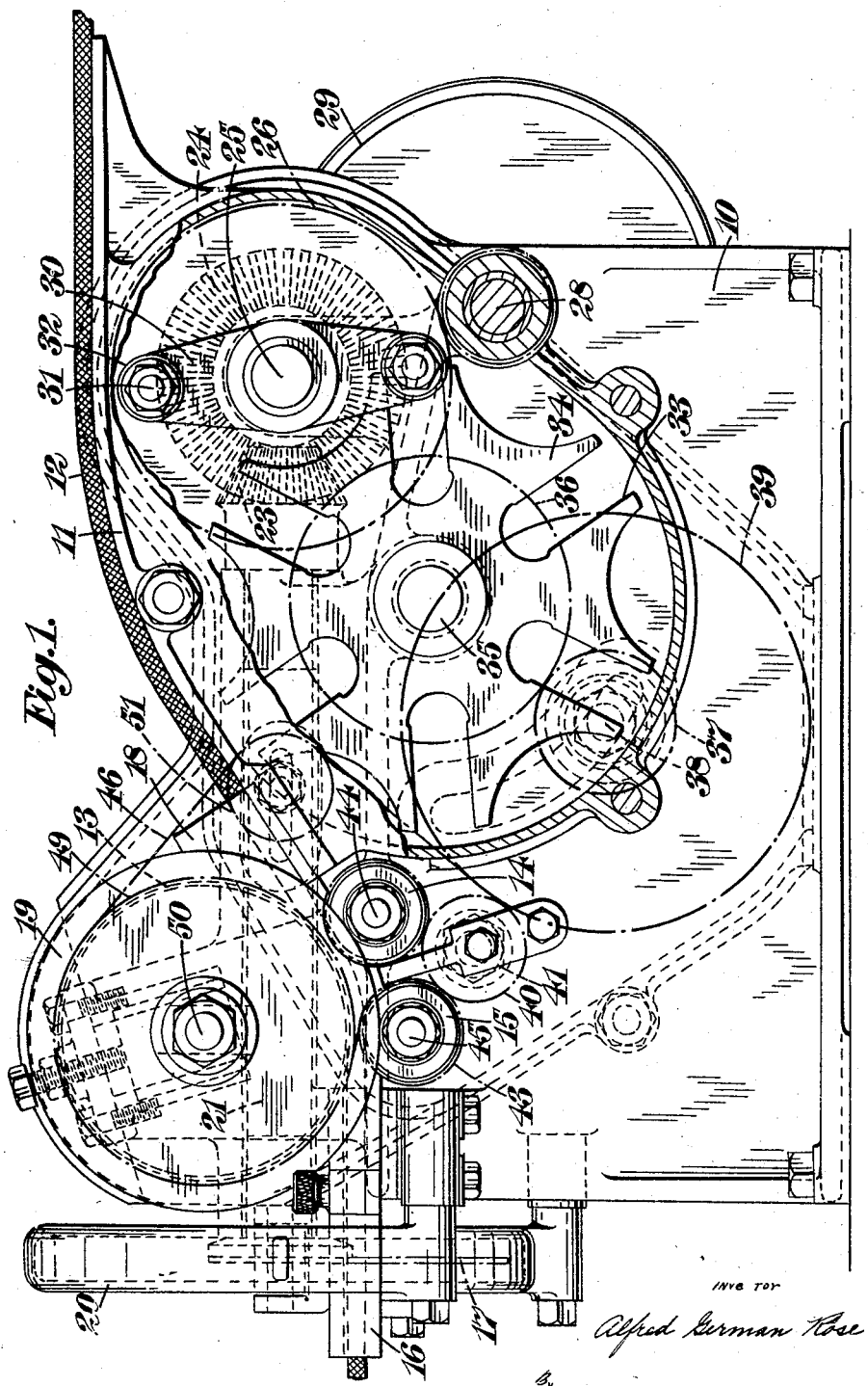
Figure 1 is an elevation of the apparatus with part of the casing broken away.
Figure 2:
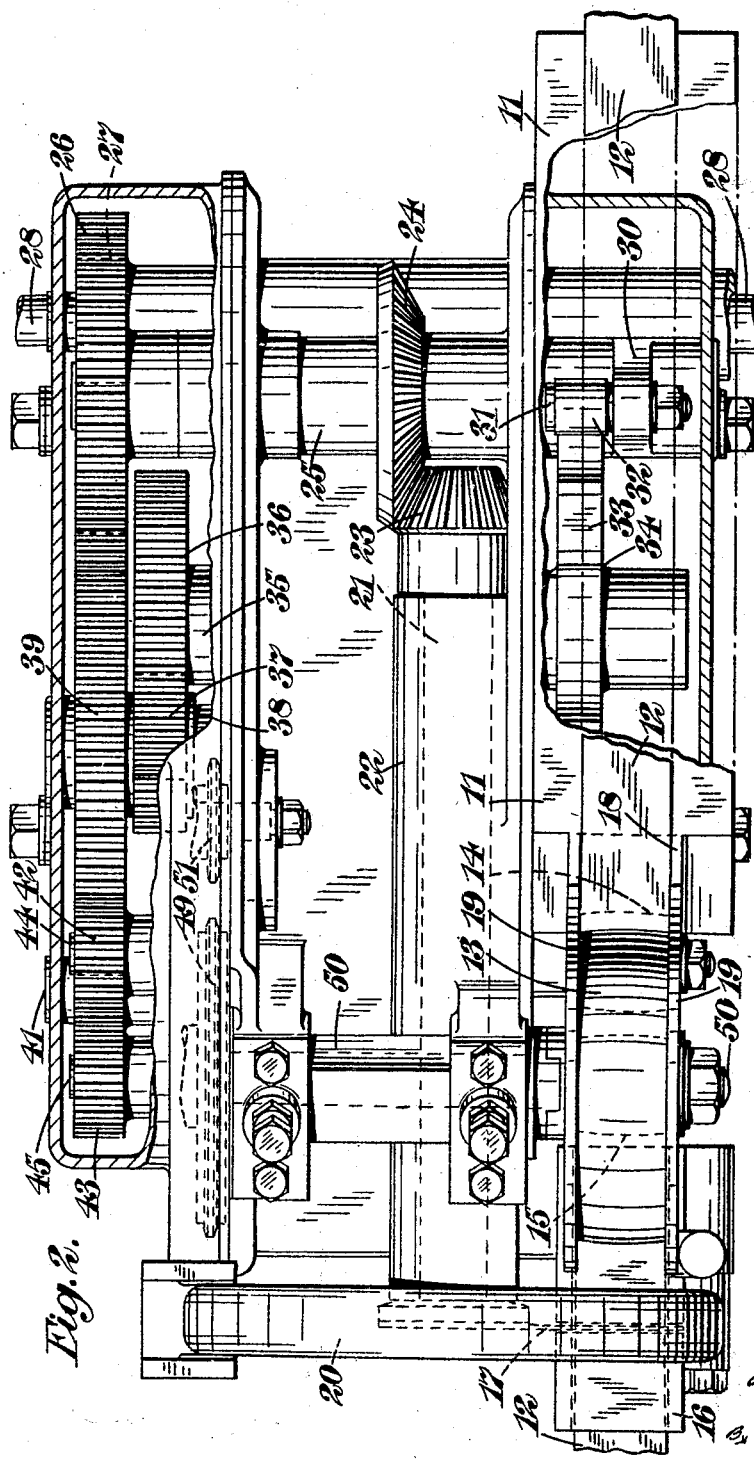
Figure 2 is a plan of the apparatus.
Figure 3:
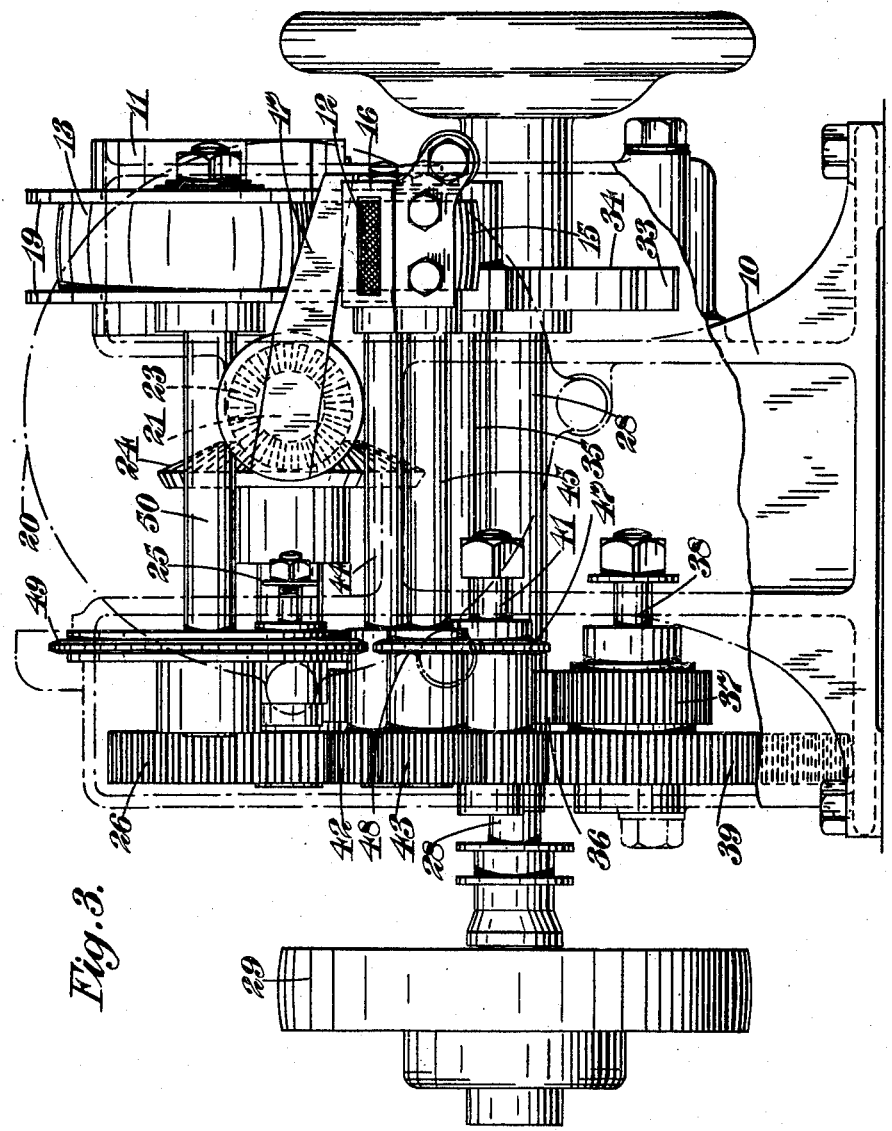
Figure 3 is an end elevation of the apparatus but with the casing and all bearings removed.

The apparatus comprises a casing 10 having a downwardly inclined guideway 11 (constituting the aforesaid "oblique way") along which a plastic bar of confectionery stock 12 is fed to a plane in which a continuously rotating knife 17 operates to sever individual caramels from the leading end of the bar. The separate caramels are then fed one at a time up to a wrapper supply station (not shown) and thence together with the wrapper into a wrapping machine.

The plastic bar is fed down the inclined guideway 11 by means of three intermittently rotating rollers 13, 14 and 15 which are driven by Geneva stop mechanism, as hereinafter described, to draw off the bar step-by-step. Towards its lower end the downwardly inclined guideway terminates in a channel shaped portion 18 from which the plastic bar 12 passes through the nip between the upper roller 13 and the first bottom roller 14. It will be observed that a line joining the axes of these two rollers lies in a plane normal to the inclined path of the stock. Upon leaving the nip the stock is bent partly around the periphery of the top roller 13 and then passes through the nip between this top roller and the second bottom roller 15. It will be observed that the axes of these two rollers lie in the same vertical plane. From the nip between the top roller 13 and the second bottom roller 15 the bar of stock passes along a horizontal guideway 16 to a cutting station at which the individual caramels are severed by a knife 17. In order to guide the bar while it is being deflected from this inclined path into the horizontal path the top roller 13 is provided at each side with flanges 19.

The knife 17 which rotates continuously in a casing 20 is mounted upon the end of a shaft 21 supported in a bearing 22 in the casing 10. At its far end the shaft 21 carries a bevel pinion 23 which is driven by a co-operating bevel gear 24 on a continuously rotating shaft 25. The latter carries at one end a large pinion 26 which meshes with a driving gear 27 upon the driving shaft 28 which shaft carries at one end a pulley 29.

Figure 4:
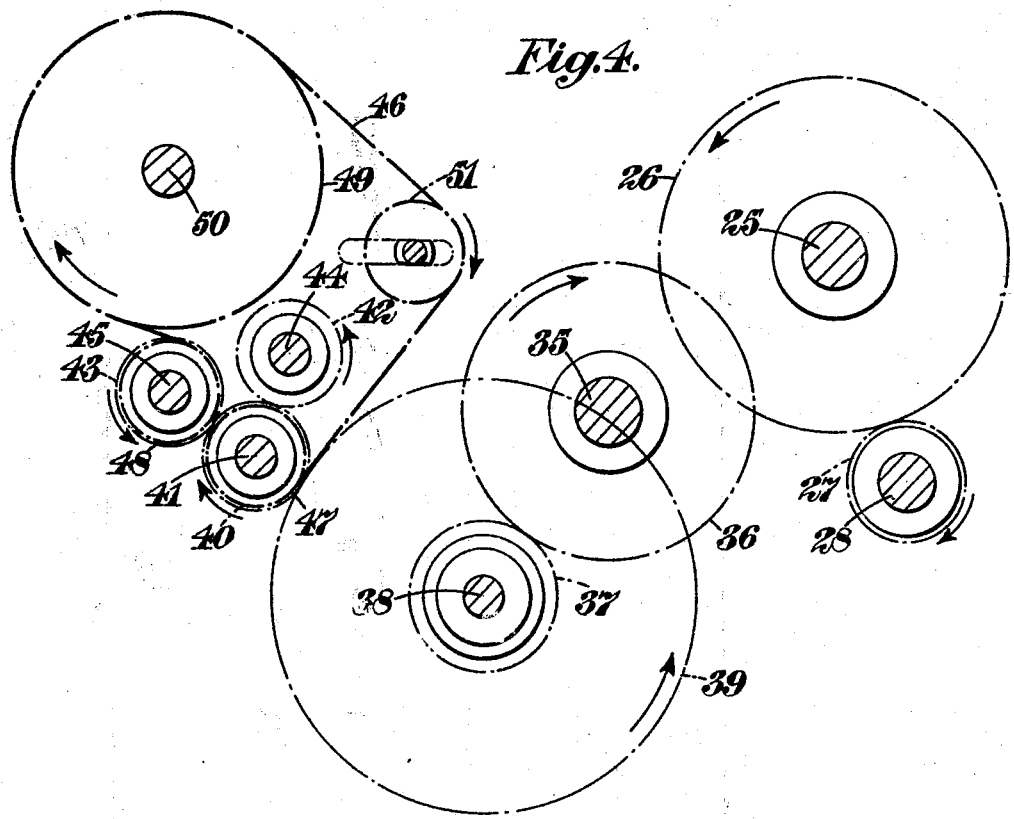
Figure 4 is a diagrammatic arrangement illustrating certain gearing in the interior of the casing.

Upon the end of the shaft 25 remote from the pinion 26 are carried two diametrically opposed crank webs 30 each of which webs carries an overhung crank pin 31 on which a roller 32 is rotatably mounted. These rollers 32 mesh with radial slots 33 in a disc 34 of Geneva stop mechanism which is carried upon one end of a shaft 35 whose axis is parallel with the above mentioned shafts 25 and 28. This shaft 35 is therefore rotated intermittently by the Geneva stop mechanism. At its end remote from the disc 34 of the Geneva stop mechanism the shaft 35 carries a gear 36 which meshes with a pinion 37 upon a short lay shaft 38. This lay shaft also carries a large gear 39 which in turn meshes with a pinion 40 carried upon a shaft 41. The pinion 40 also meshes with pinions 42 and 43 which are carried on the shafts 44 and 45 upon which the two bottom rollers 14 and 15 are respectively mounted. This train of gearing by which the two bottom rollers are driven is shown diagrammatically in Figure 4, the direction of rotation of the individual gears being indicated by the arrows.

The top roller 13 is driven by an endless chain 46 as follows. Mounted upon the shafts 41 and 45 are chained sprockets 47 and 48 respectively. The chain 46 which passes round the outside of the sprocket 47 on the shaft 41, is deflected round the sprocket 48 and thence passes over a large sprocket 49 carried upon a shaft 50 upon which the top roller 13 is mounted. Leaving the top roller sprocket the chain passes round a tensioning sprocket 51 and thence to the first mentioned sprocket 47. This chain drive is also shown diagrammatically in Figure 4.

I claim:

1. In apparatus for feeding and cutting a bar of plastic material, the combination of a knife, means to actuate said knife to sever successive portions from the length of the bar, a guideway leading to the knife, a second guideway leading obliquely to this guideway, three rollers arranged at the junction of the guideways, two of which rollers are arranged to cooperate to bend the bar partly around the periphery of the third roller and to direct it from the oblique into the first mentioned guideway, and means to rotate said rollers.

2. Apparatus for feeding and cutting a bar of plastic material, comprising a knife, means to actuate said knife to sever successive portions from the length of the bar, a horizontal guide-way leading to the knife, a second guide-way leading obliquely to the horizontal guide-way, three rollers arranged at the junction of the two said guide-ways, two of which rollers are arranged to co-operate to bend the bar partly around the periphery of the third roller and to direct it from the oblique into the horizontal guide-way, and means to rotate said rollers.

3. Apparatus for feeding and cutting a bar of plastic material, comprising a knife, means to actuate said knife to sever successive portions from the length of the bar, a horizontal guide-way leading to the knife, a second guide-way leading obliquely to the horizontal guide-way, a pair of rollers arranged one on each side of the oblique guide-way so that their axes lie in a plane normal to said guide-way, and arranged to provide the nip through which the bar may be fed, a third roller arranged to direct the bar partly around the periphery of one of the first said rollers into the horizontal guide-way, and means to rotate said rollers.

4. Apparatus for feeding and cutting a bar of plastic material, comprising a knife, means to actuate said knife to sever successive portions from the length of the bar, a horizontal guide-way leading to the knife, a second guide-way leading obliquely to the horizontal guide-way, a roller located in the angle between the two guide-ways with its axis transversely of the direction of bar feed, a second roller co-operating therewith and so placed in relation to it that the plane in which their axes lie is normal to the oblique guide-way, a third roller also co-operating with the first roller and so placed with regard to it that their axes lie in a plane normal to the horizontal guide-way, and means to rotate said rollers.

5. Apparatus for feeding and cutting a bar of plastic material, comprising a knife, means to impart continuous rotation to said knife to sever successive portions from the length of the bar, a horizontal guide-way leading to the knife, a second guide-way leading obliquely to the horizontal guide-way, a roller located in the angle between the two guide-ways with its axis transversely of the direction of bar feed, a second roller co-operating therewith to draw the bar down the oblique way and so placed in relation to said roller that their axes lie in a plane normal to the oblique way, a third roller co-operating with the first roller to direct the bar into the horizontal guide-way and so placed with regard to the first roller that their axes lie in a plane normal to the horizontal guide-way, and means to impart intermittent rotation to said rollers.

6. Apparatus for feeding and cutting a bar of plastic material, comprising a knife, means to rotate said knife continuously to sever successive portions from the length of the bar, a horizontal guide-way leading to the knife, a second guide-way arranged to lead the bar obliquely downwards to the horizontal guide-way, an upper roller located above the said guide-ways with its axis horizontal and lying in a plane intersecting the angle between them, a first bottom roller which co-operates with the upper roller to draw the bar down the oblique way, the axes of the upper roller and the first bottom roller lying in a plane normal to the oblique way, a second bottom roller which co-operates with the upper roller to pass the bar into the horizontal guide-way, the axis of the upper roller and the second bottom roller lying in the same vertical plane and means to impart intermittent rotation to said rollers so that the bar is stationary while the severance of each successive portion is effected.

7. Apparatus for feeding and cutting a bar of plastic material, comprising a knife, means to rotate said knife continuously to sever successively portions from the length of the bar, a horizontal guide-way leading to the knife, a second guide-way arranged to lead the bar obliquely downwards to the horizontal guide-way, an upper roller located above the said guide-way with its axis horizontal and lying in a plane intersecting the angle between them, a first bottom roller which co-operates with the upper roller to draw the bar down the oblique way, the axes of the upper roller and the first bottom roller lying in a plane normal to the oblique way, a second bottom roller which co-operates with the upper roller to pass the bar into the horizontal guide-way, the axis of the upper roller and the second bottom roller lying in the same vertical plane, and Geneva stop mechanism and associated gearing operable to impart intermittent rotation to said rollers so that the bar is stationary while the severance of each successive portion is effected.

In testimony whereof I affix my signature.

ALFRED GERMAN ROSE.